Dec. 13, 1949  W. K. SINGH  2,491,221
ELECTRICAL EQUIPMENT
Filed July 10, 1948
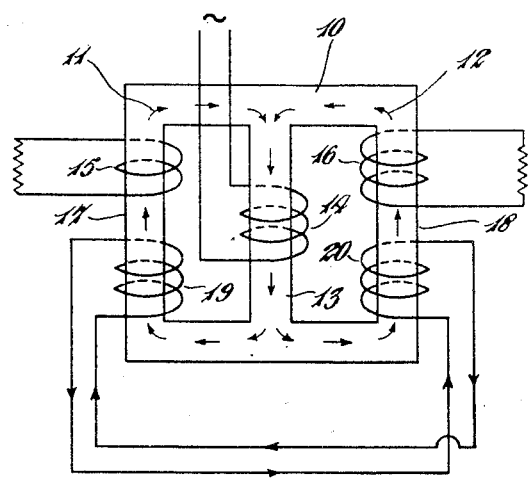
INVENTOR
WILLIAM KARTAR SINGH Patented Dec. 13, 1949

2,491,221

UNITED STATES PATENT OFFICE 2,491,221

ELECTRICAL EQUIPMENT

William Kartar Singh, South Ruislip, England

Application July 10, 1948, Serial No. 38,112
In Great Britain August 7, 1947

4 Claims. (Cl. 321—57)

1

This invention relates to electrical equipment and has for its chief object to provide a method of, and apparatus for, producing a substantially two phase current from a single phase supply without the necessity of using mechanically moving parts.

In my co-pending British patent application No. 13,490/47 I have described, and claimed, a method of producing a substantially two or more phase current from a single phase supply which comprises generating an alternating current flux in a closed iron circuit by means of a single phase supply, dividing the flux into two or more parts, varying the phase of the flux in one or more parts by means of one or more shorted turns and utilising the two or more fluxes to produce two or more alternating currents of different phase.

The present invention is somewhat similar thereto and provides means other than the one or more shorted turns for varying the flux in one or more parts of the divided flux path provided by the single phase winding.

The method of producing a substantially two phase current from a single phase supply according to the present invention in its broadest aspect comprises generating an alternating current flux in a closed iron circuit by means of a single phase supply, dividing the flux into two parts, varying the phase of the flux in one or more parts by means of two different windings connected in series with one another and disposed one about one flux path and the other about the other flux path, and utilising the two fluxes to produce two alternating currents of different phase.

The apparatus for producing a substantially two phase current from a single phase supply according to the present invention comprises a laminated iron core defining at least two parallel closed magnetic flux paths having a common portion, an input winding carried by that part of the core defining the common portion of the flux paths, a phase-controlling winding about one flux path, a second phase-controlling winding of different electrical constants about the other flux path connected in parallel with the first-mentioned phase-controlling winding, and an output winding about each flux path.

In order that this invention may be the more clearly understood and readily carried into effect, reference may be made to the accompanying drawing which illustrates diagrammatically the preferred embodiment of this invention.

Referring now to the accompanying drawing, the apparatus therein illustrated comprises a laminated iron core 10 of the form normally used

2 in transformer construction, said core defining two parallel magnetic flux paths 11 and 12 which have a common portion in the centre limb 13 of the core. An input winding 14 carried by the centre limb 13 is supplied with single phase current and the magnetic flux set up in the centre limb will, by reason of the construction of the core, be divided into two parts and will flow in the flux paths 11 and 12. Two output windings 15 and 16 are carried by the outer limbs 17, 18 of the core and in the absence of any means affecting the magnetic fluxes flowing in the paths 11 and 12 the currents in the windings 15 and 16 would be substantially in phase with one another. In accordance with the present invention two control windings 19 and 20 are wound on the limbs 17 and 18 of the core and are connected in series with one another, as shown. The electrical constants of the two windings 19 and 20 are different, for example they may comprise different numbers of turns with the result that the phases of the currents flowing in the output windings 15 and 16 will be varied and we are thus able to produce a substantially two phase current from a single source without the use of mechanically moving parts. The degree of displacement of the phase angle of the current in the output winding 15 relative to the phase of the current in the winding will depend upon the difference between the electrical constants of the two control windings 19 and 20 as will be readily understood.

Preferably one of the two phase-controlling windings 19 and 20 is so wound about its limb of the core that the current circulating therein is adapted to generate a flux in the closed iron core which aids the flux generated by the primary winding 14. By this means the efficiency of the apparatus will be improved.

With a view to still further enhancing the phase angle displacement, the two output windings 15 and 16 are arranged to have different reactances and/or to feed loads 21 and 22 of different resistances.

It will be appreciated that it is also possible to generate a three or more phase current from a single phase by treating one of the split phase currents as the primary current and producing therefrom a two-phase current in the manner described above.

I claim:

1. Apparatus for producing a substantially two phase current from a single phase supply, comprising a laminated iron core defining two parallel closed magnetic flux paths having a common portion, an input winding carried by that part of the core defining the common portion of the flux paths, a phase-controlling winding about one flux path, a second phase-controlling winding of different electrical constants about the other flux path connected in parallel with the first-mentioned phase-controlling winding, and an output winding about each flux path.

2. Apparatus for producing a substantially two phase current from a single phase supply according to claim 1, in which the two phase-controlling windings are so disposed that the current circulating therein is adapted to generate a flux in the closed iron core which aids the flux generated by the primary winding, whereby the efficiency of the apparatus is improved.

3. Apparatus for producing a substantially two phase current from a single phase supply according to claim 1, in which, with a view to enhancing the phase angle displacement, the two output windings have different reactances.

4. Apparatus for producing a substantially two phase current from a single phase supply according to claim 1, in which, with a view to enhancing the phase angle displacement, the output windings are adapted to feed loads of different resistances.

WILLIAM KARTAR SINGH.

REFERENCES CITED

The following references are of record in the file of this patent:

UNITED STATES PATENTS

| Number | Name | Date |
|---|---|---|
| 535,010 | Hunting | Mar. 5, 1895 |